US011535756B2

(12) United States Patent
Sasaki et al.

(10) Patent No.: US 11,535,756 B2
(45) Date of Patent: Dec. 27, 2022

(54) METHOD FOR PRODUCING SILICA COMPOSITE PARTICLE

(71) Applicant: FUJIFILM BUSINESS INNOVATION CORP., Tokyo (JP)

(72) Inventors: Koji Sasaki, Kanagawa (JP); Hiroyoshi Okuno, Kanagawa (JP); Yoshifumi Iida, Kanagawa (JP); Yuka Zenitani, Kanagawa (JP); Masahiro Takayama, Kanagawa (JP); Masashi Ikeda, Kanagawa (JP); Shunsuke Nozaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 859 days.

(21) Appl. No.: 16/448,593

(22) Filed: Jun. 21, 2019

(65) Prior Publication Data
US 2019/0330474 A1    Oct. 31, 2019

Related U.S. Application Data

(62) Division of application No. 15/659,946, filed on Jul. 26, 2017, now Pat. No. 10,526,493.

(30) Foreign Application Priority Data

Mar. 23, 2017  (JP) ............................... 2017-057922

(51) Int. Cl.
  *C09C 1/30*   (2006.01)
  *C09C 1/28*   (2006.01)
  *C09C 3/00*   (2006.01)
  *C01B 33/149* (2006.01)
  *C04B 35/14*  (2006.01)
  *C04B 41/49*  (2006.01)
  *C04B 41/81*  (2006.01)

(52) U.S. Cl.
  CPC .......... *C09C 1/3063* (2013.01); *C01B 33/149* (2013.01); *C04B 35/14* (2013.01); *C04B 41/4922* (2013.01); *C04B 41/81* (2013.01); *C09C 1/28* (2013.01); *C09C 1/3054* (2013.01); *C09C 1/3081* (2013.01); *C09C 3/006* (2013.01); *C01P 2004/32* (2013.01); *C01P 2004/51* (2013.01); *C01P 2004/62* (2013.01); *C01P 2004/64* (2013.01)

(58) Field of Classification Search
  CPC .................................................... C01B 33/149
  See application file for complete search history.

(56) References Cited

U.S. PATENT DOCUMENTS

| 5,856,379 | A | 1/1999 | Shiratsuchi et al. |
| 9,234,106 | B2 | 1/2016 | Ishihara et al. |
| 9,938,418 | B2 | 4/2018 | Chen et al. |
| 2009/0253851 | A1 | 10/2009 | Ohara et al. |
| 2010/0305237 | A1* | 12/2010 | Suemura ................. C08L 63/00 252/182.14 |
| 2011/0223424 | A1 | 9/2011 | Chen et al. |
| 2011/0319647 | A1* | 12/2011 | Yoshikawa ........... C01B 33/148 556/478 |
| 2014/0356624 | A1* | 12/2014 | Hama ................... C09C 1/3054 556/173 |

FOREIGN PATENT DOCUMENTS

| JP | H11-322325 A | 11/1999 |
| JP | 2003-277732 A | 10/2003 |
| JP | 2004-002723 A | 1/2004 |
| JP | 2011-037659 A | 2/2011 |
| JP | 2014-234326 A | 12/2014 |

OTHER PUBLICATIONS

Dec. 15, 2020 Office Action issued in Japanese Patent Application No. 2017-057922.
Dec. 3, 2020 Office Action issued in Chinese Patent Application No. 201711283363.0.
Jun. 22, 2021 Office Action issued in Japanese Patent Application No. 2017-057922.

* cited by examiner

*Primary Examiner* — Robert A Vetere
(74) *Attorney, Agent, or Firm* — Oliff PLC

(57) ABSTRACT

A method for producing a silica composite particle including a silica particle and at least one compound in which an aluminum atom bonds to an organic group through oxygen. The method includes: (i) providing a silica particle dispersion liquid having a silica particle content of about 20 mass % or more; (ii) mixing and reacting a compound represented by formula (S1) and the silica particle dispersion liquid to obtain a slurry; (iii) providing the at least one compound; and (iv) then mixing and reacting the slurry with the at least one compound to form the silica composite particle.

17 Claims, No Drawings

METHOD FOR PRODUCING SILICA COMPOSITE PARTICLE

CROSS-REFERENCE TO RELATED APPLICATIONS

This is a Division of application Ser. No. 15/659,946 filed Jul. 26, 2017, which in turn is allowed and is based on and claims priority under 35 USC 119 from Japanese Patent Application No. 2017-057922 filed Mar. 23, 2017. The disclosure of the prior applications is hereby incorporated by reference herein in its entirety.

BACKGROUND

(i) Technical Field

The present invention relates to a silica composite particle and a method for producing the silica composite particle.

(ii) Related Art

Silica particles are used as an additive component or a principal component for toner, cosmetics, rubber, abrasives, and the like and have roles of, for example, improving the strength of resin, improving the flowability of powder, and suppressing packing. The characteristics of silica particles are believed to be dependent on the shape and surface properties of silica particles. Thus, there have been proposed surface treatment of silica particles and combination of silica and a metal or a metal compound.

SUMMARY

According to an aspect of the invention, there is provided a silica composite particle including a silica particle and a compound in which a metal atom selected from the group consisting of Ti, Al, Zr, V, and Mg bonds to an organic group through oxygen, the silica particle being surface-treated with the compound. A coverage of a surface of the silica composite particle with the metal atom is about 0.01 at % or more and about 30 at % or less. When a binding energy peak of O1s in an oxide of the metal atom is assumed to be MO1s, a binding energy peak of O1s in $SiO_2$ is assumed to be SO1s, and a binding energy peak of O1s in the silica composite particle is assumed to be MSO1s, the binding energy peaks being detected by X-ray photoelectron spectroscopy, formula (1) below is satisfied, $$0.000452 \times X^2 - 0.059117 \times X + SO1s < MSO1s \leq (SO1s - MO1s)/100 \times X + SO1s \quad (1)$$

where X represents a coverage with other metals (Ti, Al, Zr, V, and Mg), the coverage being calculated from a ratio of the other metals (Ti, Al, Zr, V, and Mg)/Si detected by X-ray photoelectron spectroscopy.

DETAILED DESCRIPTION

Hereafter, an exemplary embodiment of the present invention will be described.
Silica Composite Particles Silica composite particles according to this exemplary embodiment are silica composite particles including silica particles and a compound (hereafter also referred to as a "metal atom-containing compound") in which a metal atom selected from the group consisting of Ti, Al, Zr, V, and Mg bonds to an organic group through oxygen, the silica particles being surface-treated with the compound. The coverage of surfaces of the silica composite particles with the metal atom is 0.01 at % or about 0.01 at % or more and 30 at % or about 30 at % or less. When the binding energy peak of O1s in an oxide of the metal atom is assumed to be MO1s, the binding energy peak of O1s in $SiO_2$ is assumed to be SO1s, and the binding energy peak of O1s in the silica composite particles is assumed to be MSO1s, the binding energy peaks being detected by X-ray photoelectron spectroscopy, formula (1) below is satisfied.

$$0.000452 \times X^2 - 0.059117 \times X + SO1s < MSO1s \leq (SO1s - MO1s)/100 \times X + SO1s \quad (1)$$

In the formula, X represents the coverage with other metals (Ti, Al, Zr, V, and Mg), the coverage being calculated from the ratio of the other metals (Ti, Al, Zr, V, and. Mg)/Si detected by X-ray photoelectron spectroscopy.

Silica particles are used as an additive component or a principal component for toner, cosmetics, rubber, abrasives, and the like and have roles of, for example, improving the strength of resin, improving the flowability of powder, and suppressing packing.

However, the present inventors have found the following. That is, when surface treatment is performed using a compound containing a metal atom under typical conditions, the compound containing a metal atom aggregates. Therefore, a part of the compound containing a metal atom aggregates and metal oxide particles are formed. Furthermore, a metal oxide having a bond metal atom-O-metal atom-) of metal atoms with an oxygen atom therebetween has a hardness different from that of silica. If the metal atoms are heterogeneously bonded to each other on the surfaces of the silica particles, the hardness varies depending on particles and the particle surfaces may have a nonuniform hardness.

In contrast, the silica composite particles according to this exemplary embodiment with the above structure have good surface hardness uniformity. The reason for this is unclear, but is considered to be as follows.

X-ray photoelectron spectroscopy (XPS) is a method for analyzing the composition and chemical bonding state of elements constituting a sample surface by irradiating the sample surface with X-rays and measuring the kinetic energy of photoelectrons released from the sample surface. For example, when the energy peak positions of the 1s orbital (O1s) of oxygen between —Al—O—Al— and, —Si—O—Si— are compared with each other, the oxygen in —Al—O—Al— has a more negatively charged state than the oxygen in —Si—O—Si— because the electronegativity of each element is Al/O/Si=1.61/2.55/1.90 and the difference in electronegativity between Al and O is larger than the difference in electronegativity between Si and O (the oxygen has a stronger force of attracting electrons). Herein, the oxygen is in a state in which electrons are easily released, and the binding energy peak shifts to lower energies. Note that the electronegativity of each metal is Ti/Al/zr/V/Mg=1.54/1.61/1.33/1.63/1.31.

It is believed that when the binding energy peak (MSO1s) of O1s in the silica composite particles satisfies the formula (1), the amount of bonds of metal atoms with an oxygen therebetween (-metal atom-O-metal atom-) is small, the metal atoms have good dispersibility on the surface, and good surface hardness uniformity is achieved.

It is also believed that when the formula (1) is satisfied in silica composite particles which use a particular metal atom selected from the group consisting of Ti, Al, Zr, V, and Mg and in which the coverage of the surfaces of the silica composite particles with the metal atom is 0.01 at % or about 0.01 at % or more and 30 at % or about 30 at % or less, better surface hardness uniformity is achieved.

Hereafter, the silica composite particles according to this exemplary embodiment will be described in detail.

Coverage with Metal Atom

The silica composite particles according to this exemplary embodiment are composite particles obtained by surface-treating particles of silicon oxide (silicon dioxide, silica) with a compound in which a metal atom selected from the group consisting of Ti, Al, Zr, V, and Mg bonds to an organic group through oxygen. That is, the silica composite particles are composite particles in which a larger amount of the metal atom is present in a surface layer portion than in an inner portion of the silica particles.

The coverage with the metal atom in the silica composite particles is 0.01 at % or about 0.01 at % or more and 30 at % or about 30 at % or less.

If the coverage with the metal atom is less than 0.01 at %, good surface hardness uniformity is sometimes not sufficiently achieved.

If the coverage with the metal atom is more than 30 at %, the reactivity during surface treatment in which silica particles are treated with another metal compound is high. Consequently, the metal atom has poor dispersibility on the surface, which deteriorates the surface hardness uniformity.

The amount of the metal atom in the silica composite particles is preferably 0.05 at % or about 0.05 at % or more and 20 at % or about 20 at % or less and more preferably 0.1 at % or about 0.1 at % or more and 10 at % or about 10 at % or less from the viewpoint of hardness uniformity.

Even when the silica composite particles according to this exemplary embodiment are obtained by surface-treating silica particles with another metal compound and further surface-treating the silica particles with a hydrophobizing agent, the coverage with the metal atom is 0.01 at % or about 0.01 at % or more and 30 at % or about 30 at % or less, preferably 0.05 at % or about 0.05 at % or more and 20 at % or about 20 at % or less, and more preferably 0.1 at % or about 0.1 at % or more and 10 at % or about 10 at % or less for the above reason.

The coverage (at %) of the surfaces of the silica composite particles with the metal atom is determined by the following method.

The coverage is determined by X-ray photoelectron spectroscopy (XPS). The measurement method is not particularly limited as long as X-ray photoelectron spectroscopy is employed. Specifically, XPS measurement is performed with an X-ray photoelectron spectrometer (JPS9000MX, manufactured by JEOL Ltd.) at an acceleration voltage of 10 kV at an electric current of 30 mA. The coverage is calculated from the ratio of the amount of another metal atom to the amount of Si atom (amount of another metal atom, amount of Si atom×100%).

Furthermore, based on the fact that the amount of another metal atom<the amount of silica atom is satisfied in the bulk and the ratio of Si/another metal atom in the bulk>the ratio of Si/another metal atom on the surface is satisfied, the core is judged to be silica. The qualitative/quantitative ultimate analysis of the bulk is performed by forming a disc with a particle weight of 0.130 g and using a scanning X-ray fluorescence spectrometer (ZSX Primus II manufactured by Rigaku Corporation) under the following conditions: X-ray output 40 kV-70 mA, measurement area 10 mmφ, and measurement time 15 minutes. The analytical values of EuLα and BiLα of the obtained data are defined as element amounts according to this exemplary embodiment. The analysis of the surface is performed by the above-described XPS.

When metals are used in combination, the analysis method is also the same. MO1s of XPS peaks is determined from an MO1s peak of each metal in consideration of the ratio of the amounts of metals added. For example, when Ti and Al are used, MO1s=A×TiO1s+B×AlO1s (A and B represent the Ti ratio and the Al ratio, respectively. When Ti and Al are added in the same amount, A=B=0.5).

Formula (1) (Binding Energy Peak Detected by X-Ray Photoelectron Spectroscopy)

In the silica composite particles according to this exemplary embodiment, when the binding energy peak of O1s in an oxide of the metal atom is assumed to be MO1s, the binding energy peak of O1s in $SiO_2$ assumed to be SO1s, and the binding energy peak of O1s in the silica composite particles is assumed to be MSO1s, the binding energy peaks being detected by X-ray photoelectron spectroscopy, the following formula (1) is satisfied.

$$0.000452 \times X^2 - 0.059117 \times X + SO1s < MSO1s \leq (SO1s - MO1s)/100 \times X + SO1s \quad (1)$$

In the formula, X represents the coverage with other metals (Ti, Al, Zr, V, and Mg) calculated from the ratio of other metals (Ti, Al, Zr, V, and Mg)/Si detected by X-ray photoelectron spectroscopy.

From the viewpoint of hardness uniformity, the following formula (2) is preferably satisfied, and the following formula (3) is more preferably satisfied.

$$0.000452 \times X^2 - 0.059117 \times 0.9X + SO1s < MSO1s \leq (SO1s - MO1s)/100 \times X + SO1s \quad (2)$$

$$0.000452 \times X^2 - 0.059117 \times 0.7 \times X + SO1s < MSO1s \leq (SO1s - MO1s)/100 \times X + SO1s \quad (3)$$

When the above formula (2) or (3) is satisfied, the amount of an another metal-O-another metal structure is further decreased, which achieves better hardness uniformity on the particle surfaces.

The binding energy peak (MO1s) of O1s in an oxide of the metal atom, the binding energy peak (SO1) of O1s in $SiO_2$, and the binding energy peak (MSO1s) of O1s in the silica composite particles, the binding energy peaks being detected by X-ray photoelectron spectroscopy, are determined by the following method.

The binding energy peaks are measured by X-ray photoelectron spectroscopy (XPS). The measurement method is not particularly limited as long as X-ray photoelectron spectroscopy is employed. Specifically, XPS measurement is performed using an X-ray photoelectron spectrometer (JPS9000MX, manufactured by JEOL Ltd.) at an acceleration voltage of 10 kV at an electric current of 30 mA.

Average Particle Size

The average particle size of the silica composite particles according to this exemplary embodiment is preferably 10 nm or about 10 nm or more and 300 nm or about 300 nm or less, more preferably 10 nm or about 10 nm or more and 150 nm or about 150 nm or less, further preferably 20 nm or about 20 nm or more and 120 nm or about 120 nm or less, and particularly preferably 40 nm or about 40 nm or more and 120 nm or about 120 nm or less from the viewpoint of flowability of particles.

The average particle size of the silica composite particles is a volume-average particle size of primary particles. Specifically, the silica composite particles are dispersed in resin particles (polyester, weight-average molecular weight: 50,000) having a particle size of 100 μm, and 100 primary particles are observed with a scanning electron microscope (SEM). The equivalent circle diameter of each of the 100 primary particles determined by image analysis. The equivalent circle diameter at the 50% cumulative volume (50th particle) from smaller particle sizes in the number-based distribution is defined as an average particle size.

Particle Size Distribution Index

The particle size distribution index of the silica composite particles according to this exemplary embodiment is preferably 1.1 or about 1.1 or more and 1.5 or about 1.5 or less and more preferably 1.1 or about 1.1 or more and 1.3 or about 1.3 or less from the viewpoint of flowability of particles.

The average circularity of the silica composite particles according to this exemplary embodiment is preferably 0.5 or about 0.5 or more and 0.99 or about 0.99 or less, 0.7 or about 0.7 or more and 0.99 or about 0.99 or less, and further preferably 0.85 or about 0.85 or more and 0.99 or about 0.99 or less.

The particle size distribution index of the silica composite particles is a particle size distribution index of primary particles. Specifically, the silica composite particles are dispersed in resin particles (polyester, weight-average molecular weight: 50,000) having a particle size of 100 μm, and 100 primary particles are observed with a SEM. The equivalent circle diameter of each of the 100 primary particles is determined by image analysis. The square root of a value obtained by dividing the equivalent circle diameter at the 84% cumulative volume (84th particle) from smaller particle sizes in the volume-based distribution by the equivalent circle diameter at the 16% cumulative volume (16th particle) is defined as a particle size distribution index.

The circularity of the primary particles is determined as follows. Specifically, the silica particles are dispersed in resin particles (polyester, weight-average molecular weight Mw=50000) having a particle size of 100 μm. The primary particles are observed with a SEM. The circularity is determined, on the basis of image analysis of the primary particles, as "100/SF2" calculated from the following formula (R1).

Circularity: (100/*SF2*)=4π×(*A/I2*)    Formula (*R1*)

In the formula (R1), i represents a perimeter of each primary particle on the image, and A represents a projected area of each primary particle.

The average circularity of the primary particles is a 50% circularity based on the cumulative frequency of the equivalent circle diameters of the 100 primary particles obtained by the image analysis. The circularity distribution index described below is a square root of a value obtained by dividing an 84% circularity by a 16% circularity based on the cumulative frequency.

Metal Atom-Containing Compound

The silica composite particles according to this exemplary embodiment are silica composite particles including silica particles and a compound (metal atom-containing compound) in which a metal atom selected from the group consisting of Ti, Al, Zr, V, and Mg bonds to an organic group through oxygen, the silica particles being surface-treated with the compound.

The organic group (containing an oxygen atom) that bonds to a metal atom through an oxygen atom in the metal atom-containing compound is preferably at least one group selected from the group consisting of an alkoxy group, an acyloxy group, an alkyl acetoacetate group (an anion of an alkyl acetoacetate compound), and an acetylacetonate group (an anion of an acetylacetone compound), and more preferably at least one group selected from the group consisting of an alkoxy group and an alkyl acetoacetate group (an anion of an alkyl acetoacetate compound).

The metal atom is preferably a metal atom selected from the group consisting of Ti, Al, Zr, and V, more preferably a metal atom selected from the group consisting of Al and Ti, and particularly preferably Al from the viewpoint of hardness uniformity.

The metal atom-containing compound is preferably a titanium compound in which an organic group bonds to a titanium atom through an oxygen atom, an aluminum compound in which an organic group bonds to an aluminum atom through an oxygen atom, a zirconium compound in which an organic group bonds to a zirconium atom through an oxygen atom, a vanadium compound in which an organic group bonds to a vanadium atom through an oxygen atom, or a magnesium compound in which an organic group bonds to a magnesium atom through an oxygen atom.

Examples of the titanium compound in which an organic group bonds to a titanium atom through an oxygen atom include titanate coupling agents such as isopropyltriisostearoyi titanate, tetraoctyibis(ditridecylphosphite) titanate, and bis(dioctylpyrophosphate)oxyacetate titanate; and titanium chelates such as titanium di-i-propoxide bis(ethylacetoacetate), titanium di-i-propoxide bis(acetylacetonate), titanium di-i-propoxide bis(triethanolaminate), titanium di-i-propoxide diacetate, and titanium di-i-propoxide dipropionate.

Examples of the aluminum compound in which n organic group bonds to an aluminum atom through an oxygen atom include aluminum alkoxides such as aluminum methoxide, aluminum ethoxide, aluminum n-propoxide, aluminum i-propoxide, aluminum n-butoxide, aluminum i-butoxide, aluminum sec-butoxide, and aluminum tert-butoxide; chelates such as aluminum ethylacetoacetate diisopropylate, aluminum trisethylacetoacetate, aluminum bisethylacetoacetate monoacetylacetonate, and aluminum trisacetylacetonate; aluminum oxide acylates such as aluminum oxide 2-ethylhexanoate and aluminum oxide laurate; complexes of β-diketone such as acetyla etonate and aluminum; complexes of β-ketoester such as ethylacetoacetate and aluminum; and complexes of carboxylic acid such as acetic acid, butyric acid, lactic acid, or citric acid and aluminum.

The aluminum compound is preferably an aluminum compound having one or more alkoxy groups (more preferably two or more alkoxy groups) from the viewpoint of the control of rate of reaction and the shape, particle size, and particle size distribution of silica composite particles to be obtained. That is, the aluminum compound is preferably an aluminum compound in which one or more alkoxy groups (an alkyl group that bonds to an aluminum atom through a single oxygen atom, more preferably 2 or more alkoxy groups) bond to an aluminum atom. The number of carbon atoms in the alkoxy group is preferably 8 or less and more preferably 2 or more and 4 or less from the viewpoint of the control of rate of reaction and the shape, particle size, and particle size distribution of silica composite particles to be obtained.

Among them, the aluminum compound is particularly preferably at least one compound selected from the group consisting of aluminum ethylacetoacetate diisopropylate, aluminum trisethylacetoacetate, aluminum bisethylacetoacetate monoacetylacetonate, and aluminum trisacetylacetonate from the viewpoint of hardness uniformity.

Examples of the zirconium compound in which an organic group bonds to a zirconium atom through an oxygen atom include zirconate coupling agents such as isopropyltriisotearoyl zirconate, tetraoctylbis(distridecylphosphite) zirconate, and bis(dioctylpyrophosphate)oxyacetate zirconate; and zirconium chelates such as zirconium di-i-propoxide bis(ethylacetoacetate), zirconium di-i-propoxide bis(acetylacetonate, zirconium di-i-propoxide bis(triethanolaminate), zirconium di-i-propoxide diacetate, and zirconium di i-propoxide dipropionate.

Examples of the vanadium compound in which an organic group bonds to a vanadium atom through an oxygen atom include vanadium alkoxides such as vanadium methoxide, vanadium ethoxide, vanadium n-propoxide, vanadium i-propoxide, vanadium n-butoxide, vanadium i-butoxide, vanadium sec-butoxide, and vanadium tert-butoxide; chelates such as vanadium ethylacetoacetate diisopropylate, vanadium trisethylacetoacetate, vanadium bisethylacetoacetate monoacetylacetonate, and vanadium trisacetylacetonate; vanadium oxide acylates such as vanadium oxide 2-ethylhexanoate and vanadium oxide laurate; complexes of β-diketone such as acetylacetonate and vanadium; complexes of β-ketoester such as ethylacetoacetate and vanadium; and complexes of carboxylic acid such as acetic acid, butyric acid, lactic acid, or citric acid and vanadium.

Examples of the magnesium compound in which an organic group bonds to a magnesium atom through an oxygen atom include magnesium alkoxides such as magnesium methoxide, magnesium ethoxide, magnesium n-propoxide, magnesium i-propoxide, magnesium n-butoxide, magnesium i-butoxide, magnesium sec-butoxide, and magnesium tert-butoxide; chelates such as magnesium ethylacetoacetate monoisopropylate, magnesium bis(ethylacetoacetate), magnesium alkylacetoacetate monoisopropylate, and magnesium bis(acetylacetonate).

The silica composite particles according to this exemplary embodiment are applicable to various products such as abrasives, toner, and cosmetics.

Method for Producing Silica Composite Particles

A method for producing silica composite particles according to this exemplary embodiment includes a step of providing a silica particle dispersion liquid having a silica particle content of 20 mass % or about 20 mass % or more, a step of mixing and reacting a compound represented by formula (S1) below and the silica particle dispersion liquid to obtain a slurry, and a step of mixing and reacting the slurry and a compound containing a metal atom selected from the group consisting of Ti, Al, Zr, V, and Mg.

$$Si(R^1)_n(OR^2)_{4-n} \quad \text{Formula (S1)}$$

In the formula (S1), $R^1$ and $R^2$ each independently represent an alkyl group or an aryl group, and n represents an integer of 1 or more and 3 or less.

The silica composite particles according to this exemplary embodiment may be particularly produced by the method for producing silica composite particles according to this exemplary embodiment.

Providing Step

The method for producing silica composite particles according to this exemplary embodiment includes a step (providing step) of providing a silica particle dispersion liquid having a silica particle content of 20 mass % or about 20 mass % or more.

Although the detailed reason is unclear, when the silica particle dispersion liquid having a silica particle content of 20 mass % or about 26 mass % or more is used, the number of silica particles in the dispersion liquid is increased, which increases the probability of reaction between the metal atom-containing compound and the silica particles. Thus, silica composite particles having good surface hardness uniformity are believed to be obtained.

The silica particle content in the silica particle dispersion liquid is preferably 20 mass % or more and 60 mass % or less, more preferably 25 mass % or more and 60 mass % or less, further preferably 30 mass % or more and 55 mass % or less, and particularly preferably 35 mass % or more and 50 mass % or less from the viewpoint of hardness uniformity.

The silica particle dispersion liquid having a silica particle content of 20 mass % or about 20 mass % or more may be directly produced. Alternatively, a silica particle dispersion liquid having a silica particle content of less than. 20 mass % may be concentrated to produce the silica particle dispersion liquid having a silica particle content of 20 mass % or about 20 mass % or more.

The method for concentrating the silica particle dispersion liquid to increase the silica particle content in the silica particle dispersion liquid to 20 mass % or about 20 mass % or more is not particularly limited, and is suitably a method in which a silica particle dispersion liquid is centrifuged and the resulting supernatant fluid is removed.

The method for producing the silica particle dispersion liquid or the method for producing a silica particle dispersion liquid before concentration is not particularly limited, but may include an alkali catalyst solution providing step below and a silica particle generating step below.

The alkali catalyst solution providing step is a step of providing an alkali catalyst solution in which an alkali catalyst is contained in an alcohol-containing solvent in a concentration of 0.6 mol/L or more and 0.85 mol/L or less.

The silica particle generating step is a step of generating silica particles by feeding a tetraalkoxysilane to the alkali catalyst solution at a feeding rate of 0.0005 mol/(mol·min) or more and 0.01 mol/(mol·min) or less relative to the amount of the alcohol while feeding an alkali catalyst at a feeding rate of 0.1 mol/(mol·min) or more and 0.4 mol/(mol·min) or less relative to the total feeding amount per minute of the tetraalkoxysilane.

Hereafter, the alkali catalyst solution providing step and the silica particle generating step will be described.

Alkali Catalyst Solution Providing Step

The alkali catalyst solution providing step is a step of providing an alkali catalyst solution by providing an alcohol-containing solvent and mixing the solvent and an alkali catalyst.

The alcohol-containing solvent may be an alcohol solvent or a mixed solvent of an alcohol and other solvents. Examples of the other solvents include water; ketones such as acetone, methyl ethyl ketone, and methyl isobutyl ketone; cellosolves such as methyl cellosolve, ethyl cellosolve, butyl cellosolve, and cellosolve acetate; and ethers such as dioxane and tetrahydrofuran. In the case of a mixed solvent, the alcohol content is preferably 80 mass % or more and more preferably 90 mass % or more.

An example of the alcohol is a lower alcohol such as methanol or ethanol.

The alkali catalyst is a catalyst for facilitating the reaction of the tetraalkoxysilane (hydrolysis reaction, condensation reaction). The alkali catalyst is, for example, a basic catalyst such as ammonia, urea, monoamine, or a quaternary ammonium salt and is particularly preferably ammonia.

The concentration (content) of the alkali catalyst is preferably 0.6 mol/L or more and 0.85 mol/L or less, more preferably 0.63 mol/L or more and 0.78 mol/L or less, and further preferably 0.66 mol/L or more and 0.75 mol/L or less. In the above range, the generation of coarse aggregates such as secondary aggregates and gelation are suppressed.

Silica Particle Generating Step

The silica particle generating step is a step of generating silica particles by feeding a tetraalkoxysilane and an alkali catalyst to an alkali catalyst solution at the above-described feeding rates and reacting the tetraalkoxysilane in the alkali catalyst solution (hydrolysis reaction, condensation reaction).

In this silica particle generating step, during the early stage of feeding the tetraalkoxysilane, core particles are generated as a result of the reaction of the tetraalkoxysilane (core particle generation stage). Then, the core particles grow (core particle growth stage) and silica particles are generated.

Examples of the tetraalkoxysilane include tetramethoxysilane, tetraethoxysilane, tetrapropoxysilane, and tetrabutoxysilane. The tetraalkoxysilane is particularly at least one compound selected from the group consisting of tetramethoxysilane and tetraethoxysilane from the viewpoint of the control of rate of reaction and the shapes, particle sizes, and particle size distributions of silica particles and silica composite particles to be obtained.

The feeding rate of the tetraalkoxysilane relative to the amount of the alcohol in the alkali catalyst solution is preferably 0.0005 mol/(mol·min) or more and 0.01 mol/(mol·min) or less, more preferably 0.001 mol/(mol·min) or more and 0.009 mol/(mol·min) or less, further preferably 0.002 mol/(mol·min) or more and 008 mol/(mol·min) or less, and particularly preferably 0.003 mol/(mol·min) or more and 0.007 mol/(mol·min) or less. In the above range, silica composite particles having a narrow particle size distribution are obtained.

This means that the tetraalkoxysilane is fed in a feeding amount of 0.0005 mol or more and 0.01 mol or less per minute relative to 1 mol of the alcohol used in the step of providing an alkali catalyst solution.

The particle size of the silica composite particles is dependent on the type of tetraalkoxysilane and the reaction conditions. However, when the total feeding amount of the tetraalkoxysilane is set to, for example, 1.08 mol or more relative to 1 L of the silica composite particle dispersion liquid, primary particles having a particle size of 100 nm or more are easily obtained. When the total feeding amount is set to 5.49 mol or less relative to 1 L of the silica composite particle dispersion liquid, primary particles having a particle size of 300 nm or less are easily obtained.

The alkali catalyst fed to the alkali catalyst solution may be the alkali catalyst exemplified in the description of the alkali catalyst solution providing step. The alkali catalyst fed together with the tetraalkoxysilane may be the same as or different from the alkali catalyst contained in the alkali catalyst solution in advance, but desirably the same as the alkali catalyst contained in the alkali catalyst solution.

The feeding rate of the alkali catalyst relative to the total feeding amount per minute of the tetraalkoxysilane is preferably 0.1 mol/(mol·min) or more and 0.4 mol/(mol·min) or less, more preferably 0.14 mol/(mol·min) or more and 0.35 mol/(mol·min) or less, and further preferably 0.18 (mol·mi) or more and 0.3 mol/(mol·min) or less. In the above range, the generation of coarse aggregates such as secondary aggregates and gelation are suppressed This means that the alkali catalyst is fed in a feeding amount of 0.001 mol or more and 0.01 mol or less per minute relative to the total feeding amount by mole per minute of the tetraalkoxysilane.

The tetraalkoxysilane and the alkali catalyst may be continuously or intermittently fed to the alkali catalyst solution.

In the silica particle generating step, the temperature (temperature during feeding) of the alkali catalyst solution is not particularly limited, and is preferably 5° C. or higher and 50° C. or lower and more preferably 15° C. or higher and 40° C. or lower.

Silane Mixing Step

The method for producing silica composite particles according to this exemplary embodiment includes a step of mixing and reacting a compound represented by the above formula (Si) and the silica particle dispersion liquid to obtain a slurry.

In the formula (S1), $R^1$ preferably each independently represent an alkyl group, more preferably an alkyl group having 1 or more and 8 or less carbon atoms, further preferably an alkyl group having 1 or more and 4 or less carbon atoms, particularly preferably a methyl group or an ethyl group, and most preferably a methyl group from the viewpoint of hardness uniformity of the silica composite particles.

In the formula (S1), $R^2$ preferably each independently represent an alkyl group, more preferably an alkyl group having 1 or more and 4 or less carbon atoms, further preferably a methyl group or an ethyl group, and particularly preferably a methyl group from the viewpoint of hardness uniformity of the silica composite particles.

In the formula (S1), n preferably represents 1 or 2 and more preferably 1 from the viewpoint of hardness uniformity of the silica composite particles.

The addition amount of the compound represented by the formula (S1) is preferably 0.01 parts by mass or more and 30 parts by mass or less, more preferably 0.1 parts by mass or more and 10 parts by mass or less, and particularly preferably 0.1 parts by mass or more and 5 parts by mass or less relative to 100 parts by mass of the silica particles.

Surface-Treating Step

The method for producing silica composite particles according to this exemplary embodiment includes a step (surface-treating step) of mixing and reacting the slurry and a compound containing a metal atom selected from the group consisting of Ti, Al, Zr, V, and mg.

The compound containing a metal atom selected from the group consisting of Ti, Al, Zr, V, and Mg in the method for producing silica composite particles according to this exemplary embodiment is the same as the metal atom-containing compound described in the silica composite particles according to this exemplary embodiment, and the desirable examples thereof are also the same.

In the surface-treating step, a group (e.g., an alkoxy group) in the metal atom-containing compound is caused to react with a silanol group on surfaces of the silica particles. Consequently, the silica particles are surface-treated with the metal atom-containing compound.

The molar ratio of the compound containing a metal atom selected from the group consisting of Ti, Al, Zr, V, and Mg to the compound represented by the formula (S1) is preferably 2:1 to 1:5, more preferably 1.5:1 to 1:3 and particularly preferably 1:1 to 1:2.

In the case where the metal atom-containing compound is diluted, the solvent is not particularly limited and may be an alcohol.

The concentration of the metal atom-containing compound in a mixed solution is preferably 0.1 mass % or more and 80 mass % or less and more preferably 10 mass % or more and 50 mass % or less.

The amount of the metal atom-containing compound added in the surface-treating step is preferably 0.01 parts by mass or more and 30 parts by mass or less, more preferably 0.1 parts by mass or more and 10 parts by mass or less, further preferably 2.0 parts by mass or more and 20 parts by mass or less, and particularly preferably 0.1 parts by mass or more and 5 parts by mass or less relative to 100 parts by mass of the silica particles.

The surface treatment conditions of the silica particles in the surface-treating step are not particularly limited. For example, the surface treatment may be performed by reacting the metal atom-containing compound under stirring in the temperature range of 5° C. or higher and 50° C. or lower.

The silica composite particles obtained through the surface-treating step are in the form of dispersion liquid. The silica composite particle dispersion liquid may be used without further treatment. Alternatively, the solvent may be removed to obtain a powder of the silica composite particles.

In the case of the silica composite particle dispersion liquid, the solid content of the silica composite particles may be adjusted by performing dilution or concentration with water or an alcohol. The silica composite particle dispersion liquid may be subjected to solvent substitution with another aqueous organic solvent such as an alcohol, an ester, or a ketone.

In the case of a powder of the silica composite particles, the solvent is removed from the silica composite particle dispersion liquid. The solvent is removed by, for example, 1) a method in which a solvent is removed by filtration, centrifugation, distillation, or the like and then drying is performed with a vacuum dryer, a tray dryer, or the like or 2) a method in which the slurry is directly dried with a fluidized-bed dryer, a spray dryer, or the like. The drying temperature is not particularly limited, but is desirably 200° C. or lower. At a drying temperature of higher than 200° C., bonding of primary particles and formation of coarse particles readily occur because of the condensation of silanol groups left on the surfaces of the silica composite particles.

Regarding the dried silica composite particles, coarse particles and aggregates may be removed by disintegration and sieving. The disintegration method is not particularly limited, but is performed with, for example, a dry mill such as a jet mill, a vibration mill, a ball mill, or a pin mill. The sieving method is performed with, for example, a publicly known screen such as a vibrating screen or an air screen.

The solvent is also removed from the silica composite particle dispersion liquid by a method in which supercritical carbon dioxide is brought into contact with a silica composite particle dispersion liquid to remove a solvent. Specifically, for example, the silica composite particle dispersion liquid is charged into an airtight reaction vessel, and then liquid carbon dioxide is introduced and heating is performed. The pressure inside the reaction vessel is increased with a high-pressure pump such that the carbon dioxide is in a supercritical state. Supercritical carbon dioxide is introduced into and discharged from the airtight reaction vessel while the temperature and pressure inside the airtight reaction vessel are higher than or equal to the critical point of carbon dioxide, which causes the supercritical carbon dioxide to flow through the silica composite particle dispersion liquid. Consequently, the supercritical carbon dioxide dissolves solvents (alcohol and water) and is discharged to the outside of the silica composite particle dispersion liquid (the outside in the airtight reaction vessel) together with the solvents. Thus, the solvents are removed.

The method for producing silica composite particles according to this exemplary embodiment may further include a step (hydrophobizing step) of surface-treating, with a hydrophobizing agent, the silica particles (silica composite particles) surface-treated with an aluminum compound. This surface treatment is performed by, for example, 1) a method in which a hydrophobizing agent is added to the silica composite particle dispersion liquid and a reaction is caused to proceed under stirring in the temperature range of, for example, 30° C. or higher and 80° C. or lower or 2) a method in which a hydrophobizing agent is added while a powder of the silica composite particles is stirred in a treatment tank such as a Henschel mixer or a fluidized bed, and the inside of the treatment tank is heated to, for example, 80° C. or higher and 300° C. or lower to gasify the hydrophobizing agent and thus a reaction is caused to proceed.

When the method for producing silica composite particles according to this exemplary embodiment includes the hydrophobizing step, the hydrophobizing step is desirably a step of hydrophobizing surfaces with a hydrophobizing agent in supercritical carbon dioxide.

Supercritical carbon dioxide refers to carbon dioxide in a state in which the temperature and pressure are higher than or equal to the critical point, and such carbon dioxide exhibits both the diffusibility of gas and the solubility of liquid. Supercritical carbon dioxide has a characteristic of extremely low interfacial tension.

When the step of hydrophobizing the surfaces of the silica composite particles with a hydrophobizing agent is performed in supercritical carbon dioxide, the hydrophobizing agent is believed to be dissolved in the supercritical carbon dioxide and easily diffused to deep portions in pores on the surfaces of the silica composite particles together with the supercritical carbon dioxide having extremely low interfacial tension. Consequently, not only the surfaces of the silica composite particles but also deep portions in pores are believed to be hydrophobized with the hydrophobizing agent.

Accordingly, in the silica composite particles whose surfaces have been hydrophobized in the supercritical carbon dioxide, even deep portions pores are subjected to the hydrophobizing treatment. Therefore, the amount of water adsorbed to and retained by the silica composite particles is small. Thus, the silica composite particles are believed to have good dispersibility for a hydrophobic object (e.g., hydrophobic resin and hydrophobic solvent).

Hereafter, the hydrophobizing step in supercritical carbon dioxide will be described.

Hydrophobizing Step in Supercritical Carbon Dioxide

In this step, specifically, for example, silica composite particles are charged into an airtight reaction vessel, and then a hydrophobizing agent is added thereto. Subsequently, liquid carbon dioxide is introduced into the airtight reaction vessel and heating is performed. The pressure inside the airtight reaction vessel is increased with a high-pressure pump such that the carbon dioxide is in a supercritical state. The hydrophobizing agent is caused to react in the supercritical carbon dioxide to hydrophobize the silica composite particles. After the completion of the reaction, the pressure inside the airtight reaction vessel is decreased and cooling is performed.

The density of the supercritical carbon dioxide is preferably 0.1 g/ml or more and 0.6 g/ml or less, more preferably 0.1 g/ml or more and 0.5 g/ml or less, and further preferably 0.2 g/ml or more and 0.3 g/ml or less.

The density of the supercritical carbon dioxide is adjusted by temperature and pressure.

The temperature in the hydrophobizing treatment, that is, the temperature of the supercritical carbon dioxide is preferably 80° C. or higher and 300° C. or lower, more preferably 100° C. or higher and 300° C. or lower, and further preferably 150° C. or higher and 250° C. or lower.

The pressure in the hydrophobizing treatment, that is, the pressure of the supercritical carbon dioxide may be any pressure as long as the above density is satisfied, but is preferably 8 MPa or more and 30 MPa or less, more preferably 10 MPa or more and 25 MPa or less, and further preferably 15 MPa or more and 20 MPa or less.

The amount (charged amount) of the silica composite particles relative to the volume of the airtight reaction vessel is preferably 50 g/L or more and 600 g/L or less, more preferably 100 g/L or more and 500 g/L or less, and further preferably 150 g/L or more and 400 g/L or less.

The amount of the hydrophobizing agent used relative to the total mass of the silica composite particles is preferably 1 mass % or more and 60 mass % or less, more preferably 5 mass % or more and 40 mass % or less, and further preferably 10 mass % or more and 30 mass % or less.

The hydrophobizing agent is, for example, a publicly known organic silicon compound having an alkyl group (e.g., a methyl group, an ethyl group, a propyl group, and a butyl group). Specific examples of the hydrophobizing agent include silane compounds such as methyltrimethoxysilane, dimethyldimethoxysilane, trimethylchlorosilane, and trimethylmethoxysilane; and silazane compounds such as hexamethyldisilazane and tetramethyldisilazane. These hydrophobizing agents may be used alone or in combination of two or more.

Among them, an organic silicon compound having a trimethyl group, such as trimethylmethoxysilane or hexamethyldisilazane, is suitably used.

EXAMPLES

Hereafter, the exemplary embodiment will be more specifically described in detail based on Examples and Comparative Examples. The exemplary embodiment is not limited to Examples below. Note that "part" and "%" are on a mass basis unless otherwise specified.

Example 1

Alkali Catalyst Solution Providing Step [Preparation of Alkali Catalyst Solution (1)]

In a 3 L glass reaction vessel equipped with a metal stirring rid, a dropping nozzle (Teflon (registered trademark) microtube pump), and a thermometer, 500 g of methanol and 75 g of 10% ammonia water are put, and they are mixed under stirring to prepare an alkali catalyst solution (1).

Particle Generating step [Preparation of Silica Particle Suspension (1)]

Next, the temperature of the alkali catalyst solution. (1) is adjusted to 25° C., and the alkali catalyst solution (1) is purged with nitrogen. Then, 180 g of tetramethoxysilane (TMOS) and 144 g of ammonia water whose catalyst ($NH_3$) concentration is 4.4% are simultaneously added dropwise at the following feeding rates while the alkali catalyst solution (1) is stirred. The feeding rate of the tetramethoxysilane (TMOS) 2.5 g/min relative to the total number of moles of the methanol in the alkali catalyst solution (1). The feeding rate of the 4.4% ammonia water is 2 g/min relative to the total feeding amount per minute of the tetramethoxysilane.

Silica particle suspension concentrating step

The silica particle suspension is centrifuged at 10° C. 13,000 rpm for 60 minutes, and the resulting supernatant fluid is removed to prepare a silica particle suspension A (concentrated product). Herein, the concentration of the silica particles is 40 mass %.

Preparation of Aluminum Compound Dilute Solution

An alcohol dilute solution is prepared by diluting an aluminum compound (aluminum ethylacetoacetate dilsopropylate, manufactured by Wako Pure Chemical Industries, Ltd.) with butanol such that the aluminum compound has a concentration of 50 mass %.

Silane Mixing Step and Surface-Treating Step for Silica Particles

The temperature of the silica particle suspension is adjusted to 25° C. One part (relative to 100 parts by mass of the silica particles) of methyltrimethoxysilane (MTMS) whose temperature is adjusted to 25° C. is added to the silica particle suspension. Then, the aluminum compound dilute solution is added thereto such that the amount of the aluminum compound is 1 part relative to 100 parts of the silica particles.

Subsequently, the silica particles are surface-treated through the reaction of the aluminum compound by performing stirring for 30 minutes. Thus, a silica composite particle suspension is obtained.

Hydrophobizing Step of Silica Composite Particles (Hydrophobizing Treatment in Supercritical Carbon Dioxide)

The Temperature inside the airtight reaction vessel containing the silica composite particle suspension is increased to 80° C. with a heater, and then the pressure is increased to 20 MPa with a carbon dioxide pump. Supercritical carbon dioxide is caused to flow through the airtight reaction vessel (the amount of supercritical carbon dioxide introduced and discharged: 170 L/min/m$^3$) to remove the solvents of the silica composite particle suspension. Thus, a powder of the silica composite particles is obtained.

Into the airtight reaction vessel containing the powder of the silica composite particles (the amount of the silica composite particles charged relative to the volume of the vessel: 200 g/L), 4.0 parts of hexamethyldisilazane is charged. Then, the airtight reaction vessel is filled with liquid carbon dioxide. The temperature is increased to 160° C. with a heater, and then the pressure is increased to 20 MPa with a carbon dioxide pump. When the temperature reaches 160° C. and the pressure reaches 20 MPa and thus the carbon dioxide is brought into a supercritical state (density of supercritical carbon dioxide: 0.163 g/ml), a stirrer is operated at 200 rpm for 30 minutes. Subsequently, the pressure is decreased to atmospheric pressure and the temperature is decreased to room temperature (25° C.) Subsequently, the stirrer is stopped, and a powder of silica composite particles (hydrophobic silica composite particles) whose surfaces have been subjected to hydrophobizing treatment is taken out.

Examples 2 to 25 and Comparative Examples 1 to 3

Hydrophobic silica composite particles are obtained in the same manner as in Example 1, except that the silica particle suspension and the conditions in the silane mixing step, surface-treating step, and hydrophobizing step are changed in accordance with Tables 1 and 2.

TABLE 1

| | Silica particle suspension | | | | Providing step | | Particle generating step | | | | |
|---|---|---|---|---|---|---|---|---|---|---|---|
| | Concentration | Average | Particle | | Component added | | Total amount added | | | Feeding rate | |
| Type | of silica particles (mass %) | particle size (nm) | size distribution index | Average circularity | Methanol (g) | 10% NH$_4$OH (g) | TMOS (g) | NH$_4$OH (g) | NH$_4$OH concentration (mass %) | TMOS flow rate (g/min) | NH$_4$OH flow rate (g/min) |
| A | 40 | 100 | 1.1 | 0.98 | 500 | 75 | 180 | 144 | 4.4 | 2.5 | 2 |
| B | 20 | 10 | 1.5 | 0.65 | 500 | 75 | 80 | 64 | 4.4 | 10 | 8 |
| C | 25 | 20 | 1.4 | 0.80 | 500 | 75 | 90 | 72 | 4.4 | 8 | 6.4 |
| D | 30 | 40 | 1.2 | 0.90 | 500 | 75 | 110 | 88 | 4.4 | 4 | 3.2 |
| E | 40 | 120 | 1.1 | 0.98 | 500 | 75 | 210 | 168 | 4.4 | 2.5 | 2 |
| F | 50 | 150 | 1.1 | 0.98 | 500 | 75 | 150 | 120 | 4.4 | 2.5 | 2 |
| G | 60 | 300 | 1.1 | 0.98 | 500 | 75 | 300 | 240 | 4.4 | 2.5 | 2 |

TABLE 2

| | Silica particle suspension | | Silane mixing step and Surface-treating step | | | | | | Hydrophobizing step |
|---|---|---|---|---|---|---|---|---|---|
| | | | Metal atom-containing compound | | | | Compound represented by formula (S1) | | |
| | Type | Concentration of silica particles (mass %) | Type of metal | Type of material | | Content relative to 100 parts by mass of silica particles (part by mass) | Type | Content relative to 100 parts by mass of silica particles (part by mass) | Amount of hexamethyldisilazane added (part by mass) |
| Ex. 1 | A | 40 | Al | ALCH | | 1 | MTMS | 1 | 15 |
| Ex. 2 | A | 40 | Al | ALCH | | 0.05 | MTMS | 0.05 | 15 |
| Ex. 3 | A | 40 | Al | ALCH | | 2 | MTMS | 2 | 15 |
| Ex. 4 | A | 40 | Al | ALCH | | 0.025 | MTMS | 0.025 | 15 |
| Ex. 5 | A | 40 | Al | ALCH | | 5 | MTMS | 5 | 15 |
| Ex. 6 | A | 40 | Al | ALCH | | 0.005 | MTMS | 0.005 | 15 |
| Ex. 7 | A | 40 | Al | ALCH | | 10 | MTMS | 10 | 15 |
| Ex. 8 | A | 40 | Ti | Titanium tetraisopropoxide | | 1 | MTMS | 1 | 15 |
| Ex. 9 | A | 40 | Zr | Isopropyltriisostearoyl zirconate | | 1 | MTMS | 1 | 15 |
| Ex. 10 | A | 40 | Mg | Magnesium i-propoxide | | 1 | MTMS | 1 | 15 |
| Ex. 11 | A | 40 | V | Vanadium i-propoxide | | 1 | MTMS | 1 | 15 |
| Ex. 12 | A | 40 | Al/Ti | ALCH/Titanium tetraisopropoxide | | 0.5/0.5 | MTMS | 1 | 15 |
| Ex. 13 | B | 20 | Al | ALCH | | 3 | MTMS | 1 | 15 |
| Ex. 14 | C | 25 | Al | ALCH | | 3 | MTMS | 1 | 15 |
| Ex. 15 | D | 30 | Al | ALCH | | 3 | MTMS | 1 | 15 |
| Ex. 16 | E | 40 | Al | ALCH | | 0.69 | MTMS | 1 | 15 |
| Ex. 17 | F | 50 | Al | ALCH | | 0.44 | MTMS | 1 | 15 |
| Ex. 18 | G | 60 | Al | ALCH | | 0.11 | MTMS | 1 | 15 |
| Ex. 19 | A | 40 | Al | ALCH | | 1 | Dimethyldimethoxysilane | 1 | 15 |
| Ex. 20 | A | 40 | Al | ALCH | | 1 | Propyltrimethoxysilane | 1 | 15 |
| Ex. 21 | A | 40 | Al | ALCH | | 1 | Octadecyltrimethoxysilane | 1 | 15 |
| Ex. 22 | A | 40 | Al | ALCH | | 1 | Phenyltrimethoxysilane | 1 | 15 |
| Ex. 23 | A | 40 | Al | ALCH | | 1 | MTMS | 0.5 | 15 |
| Ex. 24 | A | 40 | Al | ALCH | | 1 | MTMS | 3 | 15 |
| Ex. 25 | A | 40 | Al | ALCH | | 1 | MTMS | 5 | 15 |
| C.E. 1 | A | 40 | Al | ALCH | | 15 | MTMS | 15 | 15 |
| C.E. 2 | A | 40 | Al | ALCH | | 0.0025 | MTMS | 0.005 | 15 |
| C.E. 3 | A | 40 | Al | ALCH | | 1 | MTMS | 0 | 15 |

Ex.: Example,
C.E.: Comparative Example

In Table 2, aluminum ethylacetoacetate diisopropylate is abbreviated as ALCH.

Evaluation

Physical Properties of Silica Composite Particles

Regarding the hydrophobic silica composite particles in each of Examples and Comparative Examples, the coverage with a metal atom, the binding energy peak of O1s detected by X-ray photoelectron spectroscopy (XPS), the average particle size, and the particle size distribution index are determined by the methods described above. Table 3 shows the results.

Polishing Uniformity

At 10° C. and 10% RH, 1 g of particles for evaluation are uniformly placed on a soda glass sheet (diameter 40 mm, thickness 20 mm) serving as a material to be polished, and polishing is performed using a lapping machine (SPL-15, manufactured by Okamoto Machine Tool Works, Ltd.) for 30 minutes. The rotational speed of a head on the polishing pad side is 120 rpm, the rotational speed of a surface plate on the soda glass sheet side is 120 rpm, and the polishing pressure is 20 kPa.

The evaluation is performed using a substrate having no initial irregularities of 50 nm or more and having an initial surface roughness Rms of 10 nm or less. If the irregularities and roughness of a substrate to be used are large, polishing is performed by various methods until the initial irregularities of 50 nm or more are eliminated and the initial surface roughness Rms is 10 nm or less to provide a test sample. The polishing method is not particularly limited, but is, for example, a polishing method that uses cerium oxide particles.

The surface roughness Rms of each substrate is measured with an atomic force microscope (manufactured by Seiko Instruments Inc.) in a freely selected polished region (10 μm×10 μm). The surface roughness Rms is calculated as an average of 15 substrates. The evaluation criteria are shown below A: 0 nm≤Rms<0.2 nm
B: 0.2 nm≤Rms<0.4 nm
C: 0.4 nm≤Rms<0.6 nm
D: 0.6 nm≤Rms<0.8 nm Structural Defect Inhibition during Polishing In the image observed in terms of the above-described polishing uniformity, the structural defect inhibition is evaluated based on the number of irregularities of 5 nm or more. Specifically, five fields of view are observed with a scanning electron microscope S4700 (manufactured by Hitachi, Ltd.) at 10,000-fold magnification, and the number of irregularities of 50 nm or more are checked. The evaluation criteria are shown below.

A: None
B: 1 or more and 2 or less
C: 3 or more and less than 5
D: 5 or more

TABLE 3

| | Physical properties of silica composite particles | | | | | | | | |
|---|---|---|---|---|---|---|---|---|---|
| | Amount of metal | Coverage with metal | | | | Particle | | Evaluation results | |
| | (at %) Metal/Si ratio | (at %) Metal/Si ratio | SO1s | MO1s | MSO1s | Average particle size (nm) | size distribution index | Average circularity | Polishing uniformity | Structural defect inhibition |
| Example 1 | 1 | 5.0 | 532.80 | 531.30 | 532.60 | 100 | 1.1 | 0.980 | A | A |
| Example 2 | 0.05 | 0.1 | 532.80 | 531.30 | 532.80 | 100 | 1.1 | 0.980 | A | A |
| Example 3 | 2 | 10 | 532.80 | 531.30 | 532.43 | 100 | 1.1 | 0.980 | B | A |
| Example 4 | 0.025 | 0.05 | 532.80 | 531.30 | 532.80 | 100 | 1.1 | 0.980 | A | B |
| Example 5 | 5 | 20.0 | 532.80 | 531.30 | 532.15 | 100 | 1.1 | 0.980 | B | A |
| Example 6 | 0.005 | 0.01 | 532.80 | 531.30 | 532.80 | 100 | 1.1 | 0.980 | A | B |
| Example 7 | 10 | 30 | 532.80 | 531.30 | 531.97 | 100 | 1.1 | 0.980 | B | A |
| Example 8 | 1 | 5.0 | 532.80 | 530.94 | 532.60 | 100 | 1.1 | 0.980 | A | A |
| Example 9 | 1 | 5.0 | 532.80 | 529.85 | 532.60 | 100 | 1.1 | 0.980 | A | B |
| Example 10 | 1 | 5.0 | 532.80 | 529.75 | 532.60 | 100 | 1.1 | 0.980 | B | A |
| Example 11 | 1 | 5.0 | 532.80 | 531.40 | 532.60 | 100 | 1.1 | 0.980 | B | A |
| Example 12 | 1 | 5.6 | 532.80 | 531.12 | 532.58 | 100 | 1.1 | 0.980 | A | A |
| Example 13 | 3 | 3.5 | 532.80 | 531.30 | 532.66 | 10 | 1.5 | 0.650 | A | B |
| Example 14 | 3 | 4.0 | 532.80 | 531.30 | 532.64 | 20 | 1.4 | 0.800 | A | B |
| Example 15 | 3 | 4.5 | 532.80 | 531.30 | 532.62 | 40 | 1.2 | 0.900 | A | A |
| Example 16 | 1 | 5.0 | 532.80 | 531.30 | 532.60 | 120 | 1.1 | 0.980 | A | A |
| Example 17 | 1 | 5.0 | 532.80 | 531.30 | 532.60 | 150 | 1.1 | 0.980 | B | A |
| Example 18 | 1 | 5.0 | 532.80 | 531.30 | 532.60 | 300 | 1.1 | 0.980 | B | A |
| Example 19 | 1 | 5.0 | 532.80 | 531.30 | 532.60 | 100 | 1.1 | 0.980 | A | A |
| Example 20 | 1 | 5.0 | 532.80 | 531.30 | 532.60 | 100 | 1.1 | 0.980 | A | A |
| Example 21 | 1 | 5.0 | 532.80 | 531.30 | 532.60 | 100 | 1.1 | 0.980 | A | A |
| Example 22 | 1 | 5.0 | 532.80 | 531.30 | 532.60 | 100 | 1.1 | 0.980 | A | A |
| Example 23 | 1 | 5.0 | 532.80 | 531.30 | 532.55 | 100 | 1.1 | 0.980 | B | A |
| Example 24 | 1 | 5.0 | 532.80 | 531.30 | 532.55 | 100 | 1.1 | 0.980 | B | A |
| Example 25 | 1 | 5.0 | 532.80 | 531.30 | 532.55 | 100 | 1.1 | 0.980 | B | A |
| Comparative Example 1 | 15 | 40 | 532.80 | 531.30 | 531.30 | 100 | 1.1 | 0.980 | D | C |
| Comparative Example 2 | 0.0025 | 0.005 | 532.80 | 531.30 | 532.80 | 100 | 1.1 | 0.980 | C | D |
| Comparative Example 3 | 1 | 5.0 | 532.80 | 531.30 | 532.33 | 100 | 1.1 | 0.980 | D | C |

As is clear from the above results, the hydrophobic silica composite particles in Examples 1 to 25 have better surface hardness uniformity than the hydrophobic silica composite particles in Comparative Examples 1 to 3

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for producing a silica composite particle, the method comprising:
   (i) providing a silica particle dispersion liquid having a silica particle content of about 20 mass % or more;
   (ii) mixing and reacting a compound represented by formula (Si) and the silica particle dispersion liquid to obtain a slurry, where the compound represented by formula (S1) is:

$$Si(R^1)_n(OR^2)_{4-n} \qquad \text{Formula (S1)}$$

where $R_1$ and $R_2$ each independently represent an alkyl group or an aryl group, and n represents an integer of 1 or more and 3 or less;
   (iii) providing at least one compound in which an aluminum atom bonds to an organic group through oxygen; and
   (iv) then mixing and reacting the slurry with the at least one compound to form the silica composite particle in which a coverage X of a surface of the silica composite particle with the aluminum atoms of the at least one compound is about 0.01 at % or more and about 30 at % or less,
   where the coverage X is calculated from a ratio of the aluminum Al/Si detected by X-ray photoelectron spectroscopy.

2. The method of claim 1, wherein the step of providing the silica particle dispersion liquid having a silica particle content of about 20 mass % or more includes:
   (i) providing an aqueous silica particle dispersion liquid; and
   (ii) concentrating the aqueous silica particle dispersion liquid by removing water from the liquid so that the concentrated liquid has an amount of silica particles in the range of 25 mass % or more and 60 mass % or less.

3. The method of claim 1, wherein the aluminum atom of the at least one compound is bonded to at least one of an acyloxy group, an alkyl acetoacetate group, and an acetylacetonate group.

4. The method of claim 1, wherein the at least one compound is selected from the group consisting of aluminum alkoxides, aluminum chelates, aluminum oxide acylates, aluminum complexes of β-diketone, aluminum complexes of β-ketoester, and aluminum complexes of carboxylic acid.

5. The method of claim 1, wherein the at least one compound is an aluminum alkoxide selected from the group consisting of aluminum methoxide, aluminum ethoxide, aluminum n-propoxide, aluminum i-propoxide, aluminum n-butoxide, aluminum i-butoxide, aluminum sec-butoxide, and aluminum tert-butoxide.

6. The method of claim 1, wherein the silica composite particle has an average particle size of about 10 nm or more and about 300 nm or less.

7. The method of claim 1, wherein the silica composite particle has an average circularity of about 0.5 or more and about 0.99 or less.

8. The method of claim 1, wherein the silica composite particle has a particle size distribution index of about 1.1 or more and about 1.5 or less.

9. The method of claim 1, wherein:
   when a binding energy peak of O1s in an oxide of the aluminum atoms is assumed to be MO1s, a binding energy peak of O1s in $SiO_2$ is assumed to be SO1s, and a binding energy peak of O1s in the silica composite particle is assumed to be MSO1s, the binding energy peaks being detected by X-ray photoelectron spectroscopy, formula (1) below is satisfied, $$0.000452 \times X^2 - 0.059117 \times X + SO1s < MSO1s \leq (SO1s - MO1s)/100 \times X + SO1s \qquad (1).$$

10. The method of claim 9, wherein formula (2) below is satisfied, $$0.000452 \times X^2 - 0.059117 \times 0.9X + SO1s < MSO1s \leq (SO1s - MO1s)/100 \times X + SO1s \qquad (2).$$

11. The method of claim 9, wherein formula (3) below is satisfied, $$0.000452 \times X^2 - 0.059117 \times 0.7 \times X + SO1s < MSO1s \leq (SO1s\ MO1s)/100 \times X + SO1s \qquad (3).$$

12. The method of claim 1, wherein the silica composite particle has an average circularity of more than 0.85 and about 0.99 or less.

13. The method of claim 1, wherein the coverage X is about 0.05 at % or more and about 20 at % or less.

14. The method of claim 1, wherein:
    an addition amount of the compound represented by the formula (Si) in step (ii) is 0.01 parts by mass or more and 30 parts by mass or less with respect to 100 parts by mass of the silica particles; and
    an addition amount of the at least one compound in step (iv) is 0.01 parts by mass or more and 10 parts by mass or less with respect to 100 parts by mass of the silica particles.

15. The method of claim 1, wherein steps (ii)-(iv) are continuous processes.

16. The method of claim 1, wherein the compound represented by formula (S1) is selected from the group consisting of methyltrimethoxysilane, dimethyldimethoxysilane, propyl-trimethoxysilane, octadecyl-trimethoxysilane, and phenyl-trimethoxysilane.

17. The method of claim 1, further comprising:
    (v) subjecting the silica composite particle to hydrophobization with hexamethyldisilazane.

* * * * *